United States Patent
Bowe et al.

(10) Patent No.: US 7,300,635 B2
(45) Date of Patent: Nov. 27, 2007

(54) CATALYTIC REACTOR

(75) Inventors: Michael Joseph Bowe, Preston (GB); John William Stairmand, Chester (GB); Ian Frederick Zimmerman, Wimborne (GB); Jason Andrew Maude, Cheadle (GB)

(73) Assignee: CompactGTL PLC, Abingdon (GB)

( * ) Notice: Subject to any disclaimer, the term of this patent is extended or adjusted under 35 U.S.C. 154(b) by 405 days.

(21) Appl. No.: 10/169,901

(22) PCT Filed: Jan. 10, 2001

(86) PCT No.: PCT/GB01/00077

§ 371 (c)(1),
(2), (4) Date: Sep. 11, 2002

(87) PCT Pub. No.: WO01/51194

PCT Pub. Date: Jul. 19, 2001

(65) Prior Publication Data

US 2003/0105172 A1 Jun. 5, 2003

(30) Foreign Application Priority Data

Jan. 11, 2000 (GB) .................... 0000473.9
Mar. 20, 2000 (GB) .................... 0006620.9

(51) Int. Cl.
*B01J 8/04* (2006.01)
*C01B 3/32* (2006.01)

(52) U.S. Cl. ............ 422/190; 422/211; 422/222; 48/127.9; 48/127.5; 48/127.7

(58) Field of Classification Search .......... 422/211, 422/222, 190, 177, 174; 518/704; 48/127.9, 48/127.7, 127.5
See application file for complete search history.

(56) References Cited

U.S. PATENT DOCUMENTS 5,328,359 A * 7/1994 Retallick ................ 431/326

(Continued)

FOREIGN PATENT DOCUMENTS

DE 19654361 6/1998

(Continued)

OTHER PUBLICATIONS

R.J. Charlesworth, A. Gough, and C. Ramshaw, "Combustion and Steam Reforming of Methane on Thin Layer Catalysts for use in Catalytic Plate Reactors"; The 1996 Cheme Research Event/Second European Conference for Young Researchers; pp. 832-834.

(Continued)

*Primary Examiner*—N. Bhat
(74) *Attorney, Agent, or Firm*—William H. Holt

(57) ABSTRACT

A catalytic reactor comprises a plurality of fluid-impermeable plates defining flow channels between them. Tight fitting within each flow channel is a sheet of corrugated material whose surfaces are coated with catalytic material. At each end of the flow channels are headers to supply gas mixtures to the flow channels, the headers communicating with adjacent channels being separate. The reactor enables different gas mixtures to be supplied to adjacent channels, which may be at different pressures, and the corresponding chemical reactions are also different. Where one of the reactions is endothermic while the other reaction is exothermic, heat is transferred through the wall of the tube separating the adjacent channels, from the exothermic reaction to the endothermic reaction.

23 Claims, 6 Drawing Sheets

U.S. PATENT DOCUMENTS

| | | | | |
|---|---|---|---|---|
| 5,342,588 | A | * | 8/1994 | Humpolik ............... 422/311 |
| 5,534,328 | A | | 7/1996 | Ashmead ............... 428/166 |
| 5,611,214 | A | | 3/1997 | Wegeng ............... 62/498 |
| 5,672,629 | A | * | 9/1997 | Heil et al. ............... 518/704 |
| 5,690,763 | A | | 11/1997 | Ashmead ............... 156/60 |
| 5,785,942 | A | | 7/1998 | Hippel ............... 423/376 |
| 5,829,517 | A | | 11/1998 | Schmid ............... 165/167 |
| 6,098,396 | A | | 8/2000 | Wen ............... 60/39.02 |
| 2003/0105172 | A1 | * | 6/2003 | Bowe et al. ............... 518/728 |
| 2004/0237303 | A1 | * | 12/2004 | Maude ............... 29/890 |
| 2005/0013769 | A1 | * | 1/2005 | Bowe et al. ............... 423/652 |
| 2005/0234138 | A1 | * | 10/2005 | Bowe ............... 518/726 |

FOREIGN PATENT DOCUMENTS

| | | | |
|---|---|---|---|
| DE | 19825102 | | 12/1999 |
| DE | 19923431 | | 12/1999 |
| EP | 0885653 | * | 6/1988 |
| EP | 0 571 056 | * | 5/1993 |
| EP | 0 724 069 | * | 7/1996 |
| EP | 0906890 | | 4/1999 |
| GB | 1490977 | | 11/1977 |
| GB | 1531134 | * | 11/1978 |
| GB | 1 546 097 | * | 5/1979 |
| GB | 1546097 | | 5/1979 |
| WO | 97/14497 | | 4/1997 |
| WO | 99/00186 | | 1/1999 |
| WO | 99/64146 | | 12/1999 |
| WO | 01/12540 | | 2/2001 |
| WO | WO 01/51194 | * | 7/2001 |
| WO | WO 03/033132 | * | 4/2003 |

OTHER PUBLICATIONS

English language abstract of DE 19654361.
English language abstract of DE 19825102.

* cited by examiner

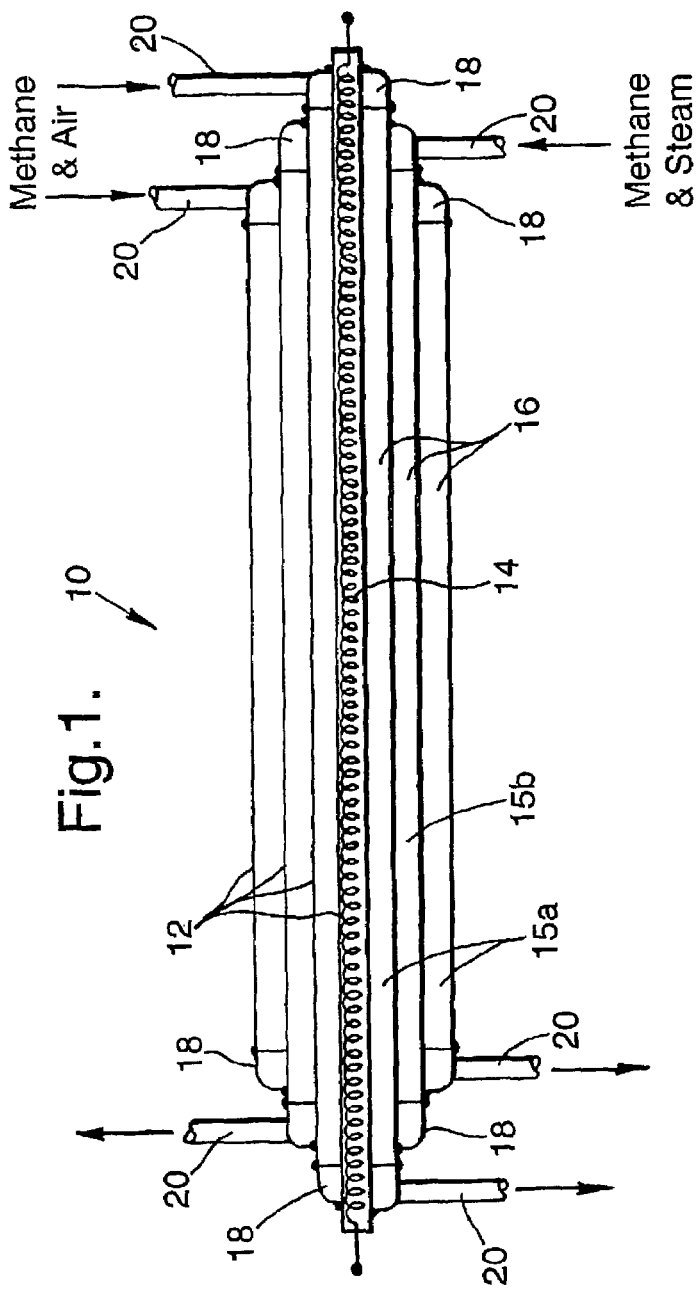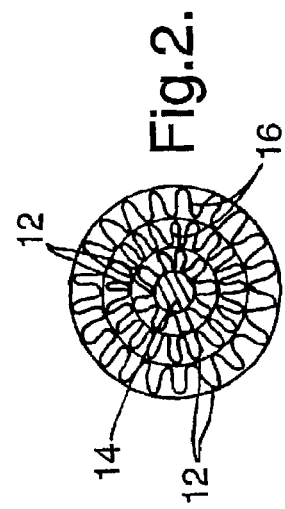

CATALYTIC REACTOR

This invention relates to a catalytic reactor suitable for use in performing gas phase reactions at elevated pressures, and particularly but not exclusively for performing endothermic reactions, and also to a chemical process using the catalytic reactor.

The use of catalytic material supported on a metal substrate is well known. For example GB 1 490 977 describes a catalyst comprising an aluminium-bearing ferritic alloy substrate, coated with a layer of a refractory oxide such as alumina, titania or zirconia, and then with a catalytic platinum-group metal. As described in GB 1 531 134 and GB 1 546 097, a catalyst body may comprise substantially flat sheets and corrugated sheets of such material arranged alternately so as to define channels through the body, either several such sheets arranged in a stack, or two such sheets wound together to form a coil. In these examples both the flat sheets and the corrugated sheets have small-scale corrugations superimposed upon them to help in the formation of the coating. Such catalyst bodies are described as being suitable for use in treating exhaust gas from vehicles.

The construction of a compact catalytic reactor in which the flow channels for the gases are defined by grooves in plates arranged in a stack, and in which the plates are bonded together (using solder), is described in WO 99/64146 (DBB Fuel Cell Engines GmbH). At least some of the grooves may contain a catalyst on the walls, while a heat transfer medium may be supplied to the other set of grooves; if the desired reaction is endothermic, heat may be supplied directly by catalytic oxidation of a fuel in the other grooves. For example it might be used for water vapour reforming of hydrocarbons. Such a reactor is referred to as a microreactor, and the grooves are referred to as micro-structures; for example the plates themselves are said to be of thickness between 0.3 and 0.5 mm, so that the grooves are of very small cross sectional area. For many chemical processes such small scale flow channels are disadvantageous, if only because of the consequential pressure drop required to cause flow along them. EP 0 885 653 A (Friedrich et al.) describes an alternative type of catalytic reactor in which the channels are of larger cross-section, being defined by a single long sheet folded into a concertina or zigzag, so as to form many parallel flow paths, and with a corrugated foil placed in each flow path. The foils may be coated with suitable catalysts. The foils are removable. Such a reactor is not suitable for use with a significant pressure difference between adjacent flow channels, as any pressure difference must be withstood by the entire area of each flow channel; and because one side and both ends of each flow channel are open. U.S. Pat. No. 6,098,396=DE 19923431 (Wen et al.) describes a catalytic reactor for use in combination with an internal combustion engine, consisting of several corrugated foils with different catalysts on the opposed surfaces, one catalyzing an exothermic reaction and the other an endothermic reaction; a fuel/air mixture flows over both surfaces, the endothermic reaction preventing the catalyst overheating. There is no pressure difference between the gases on opposite sides of each foil, as the same gas mixture is supplied to each side.

The present invention accordingly provides a catalytic reactor comprising a plurality of metal sheets arranged to define first gas flow channels between adjacent sheets, means to define second gas flow channels in proximity to the first gas flow channels, arranged so as to ensure good thermal contact between gases in the first and the second gas flow channels, catalytic material on at least some surfaces within each flow channel, and headers to supply gas mixtures to the gas flow channels, the headers being arranged to supply different gas mixtures to the first and the second gas flow channels, the metal sheets being substantially flat and the gas flow channels being defined by grooves therein such that the gases in the first and the second gas flow channels may differ in pressure by several atmospheres, and the portions of the sheet between the grooves being in contact with the adjacent metal sheet and so providing thermal contact, and the metal sheets being bonded together as a stack, and characterized by corrugated foils provided in the gas flow channels, the foils being of an aluminium-bearing ferritic steel that forms an adherent oxide coating of alumina when heated in air, and having the catalytic material on their surfaces.

The second gas flow channels may also be defined between the metal sheets, first and second gas flow channels being defined alternately between successive such sheets.

The good thermal contact between gases in adjacent flow channels is enhanced by sandwiching corrugated metal foil within each gas flow channel. This foil may also act as a carrier for the catalytic material. The adjacent metal sheets may be bonded together by diffusion bonding. To ensure the required good thermal contact, both the first and the second gas flow channels are preferably less than 5 mm wide in at least one direction transverse to the gas flow direction. More preferably both the first and the second gas flow channels are less than 2 mm wide in at least one such direction.

The grooves may be machined across the surfaces of the sheets, the reactor comprising a stack of such grooved sheets, the grooves in adjacent plates following different paths. The grooves themselves might be for example 20 mm wide, each groove accommodating a corrugated sheet or foil of material coated with catalytic material. To ensure that the gas flow channels are gas tight the plates or sheets are bonded together.

In use of the catalytic reactor, the gas mixture supplied to each gas flow channel is different from the gas mixture supplied to the adjacent channels, and the corresponding chemical reactions are also different. Preferably one of the reactions is endothermic while the other reaction is exothermic. In that case heat is transferred through the sheet separating the adjacent channels, from the exothermic reaction to the endothermic reaction.

Preferably the sheets themselves are also coated with suitable catalytic material.

This reactor is particularly suitable for performing methane/steam reforming (which is an endothermic reaction, generating hydrogen and carbon monoxide), and the alternate channels might contain a methane/air mixture so that the exothermic oxidation reaction provides the necessary heat for the endothermic reforming reaction. For the oxidation reaction several different catalysts may be used, for example palladium or platinum on a ceramic support; for example platinum on a lanthanum-stabilised alumina support, or palladium on zirconia. The preferred catalyst for the oxidation reaction is platinum on stabilised alumina. For the reforming reaction also several different catalysts may be used, for example nickel, platinum, palladium, ruthenium or rhodium, which may be used on ceramic coatings; the preferred catalyst for the reforming reaction is rhodium or platinum/rhodium on alumina. The oxidation reaction may be carried out at substantially atmospheric pressure, while the reforming reaction is preferably carried out at elevated pressure, for example up to 2 MPa (20 atmospheres), more typically 300 kPa or 500 kPa.

It will be appreciated that the materials of which the reactors are made are subjected to a severely corrosive atmosphere in use, for example the temperature may be as high as 900° C., although more typically around 750° C. The reactor may be made of a metal such as an aluminium-bearing ferritic steel, in particular of the type known as Fecralloy (trade mark) which is iron with up to 20% chromium, 0.5-12% aluminium, and 0.1-3% yttrium. For example it might comprise iron with 15% chromium, 4% aluminium, and 0.3% yttrium. When this metal is heated in air it forms an adherent oxide coating of alumina which protects the alloy against further oxidation. Where this metal is used as a catalyst substrate, and is coated with a ceramic layer into which a catalyst material is incorporated, the alumina oxide layer on the metal is believed to bind with the oxide coating, so ensuring the catalytic material adheres to the metal substrate.

The invention will now be further and more particularly described, by way of example only, and with reference to the accompanying drawings in which:

FIG. 1 shows a longitudinal sectional view of a catalytic reactor;

FIG. 2 shows a cross sectional view of the reactor of FIG. 1;

Figure 3:
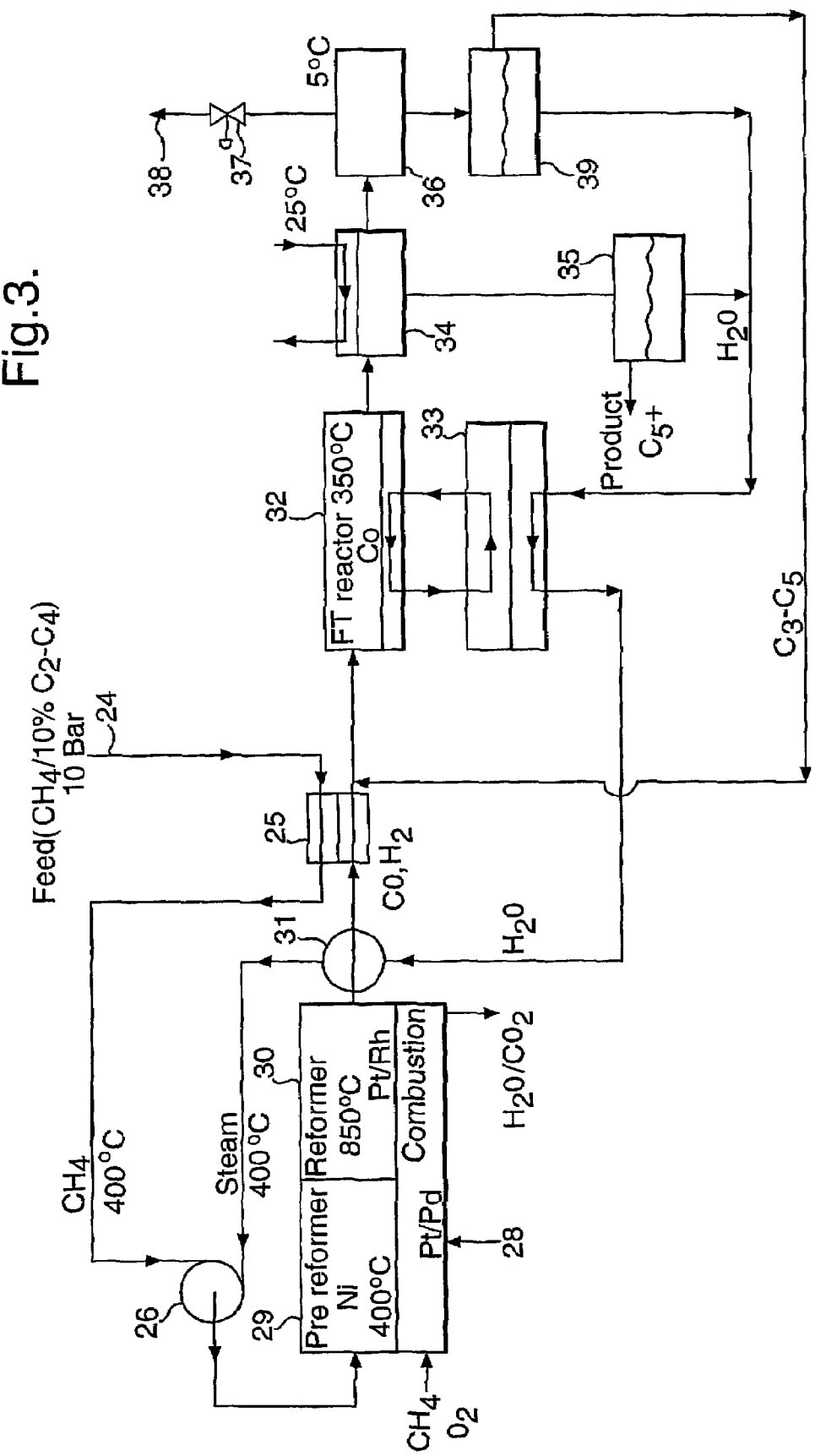
FIG. 3 shows a flow diagram of a chemical process that may be performed with the reactor of FIGS. 1 and 2.

Referring to FIG. 1 a catalytic reactor 10 consists of several nested concentric pressure tubes 12 of Fecralloy steel, each of wall thickness 0.5 mm (only four are shown in the figure, but the number of tubes 12 might in practice be say fifteen or sixteen). The innermost tube 12 contains an electrical heating element 14. As shown in FIG. 2, the annular channels 15 between the tubes 12 locate foils 16 of corrugated Fecralloy steel whose corrugations are typically 2.0 mm high (peak to peak) with a pitch of 2.0 mm.

The corrugated foils 16 may be made as described in GB 1 546 097, by passing a flat strip of Fecralloy steel of thickness 0.05 mm through two successive sets of corrugating rollers. The first rollers form miniature corrugations which extend across the strip at an acute angle to its longitudinal axis; the miniature corrugations might for example be of height 0.1 mm and have a pitch of 0.1 mm. The strip is then passed through a second set of corrugating rollers which produce the larger size corrugations without damaging the miniature corrugations. The larger corrugations extend across the strip at the same acute angle to the longitudinal axis, and as mentioned-above are typically 2.0 mm high and of pitch 2.0 mm.

The reactor 10 is assembled by cutting a length of corrugated strip equal to the circumference of the first annular channel, and placing that onto the innermost tube 12; the next tube would be a tight fit onto the corrugated strip, but is heated to 250° C. before being slid over the corrugated strip, so it shrinks tightly onto the corrugated strip. Once it has cooled this procedure is repeated. A length of corrugated strip is cut equal to the circumference of the next annular channel, and is placed onto the outer tube 12; the next tube is heated to 250° C. before being slid over the corrugated strip, so it shrinks tightly onto it. Each strip may be of width equal to the axial length of the annular channel, or alternatively and preferably a number of narrower strips may be laid side-by-side to make up the required axial length. For simplicity in manufacture all the corrugated strips are made with the same rollers, so all the corrugations have the same orientation. Hence any one corrugation meets the edges of the strip at positions whose separation (along the length of the strip) is preferably equal to the circumference of the first annular channel. Consequently when assembled into the reactor 10 each such corrugation defines a helical path.

When all the tubes 12 and corrugated foils 16 have been assembled, the surfaces of the first, third, fifth etc. annular channels 15a are coated with a zirconia sol, and the surfaces of the second, fourth, sixth etc. annular channels 15b are coated with an alumina sol. This may be performed by temporarily blocking the end of one set of annular channels, for example with wax, and immersing the assembly in the appropriate sol. The assembly is then dried slowly, and then sintered, for example in an air furnace, raising the temperature to for example 1100° C. over a period of four hours and then holding it at that temperature for a further four hours. After cooling the coated assembly, catalyst materials are then introduced for example in the form of a salt of the appropriate metal: palladium is introduced onto the zirconia coating in the channels 15a, and rhodium is introduced onto the alumina coating in the channels 15b in this example. The catalyst metals are then formed by a heat treatment to decompose (or reduce) the salt.

Annular end caps 18 are then laser welded onto the ends of each annular channel 15, each end cap 18 communicating with an inlet or outlet duct 20. The external diameter of the resulting reactor 10 is 50 mm, and it is of length 500 mm.

The reactor 10 is particularly suitable for performing steam/methane reforming, that is to say the reaction:

$$H_2O + CH_4 \rightarrow CO + 3H_2$$

This reaction is endothermic, and is catalysed by the rhodium catalyst in the channels 15b. The heat required to cause this reaction may be provided by combustion of methane, that is to say:

$$CH_4 + 2O_2 \rightarrow CO_2 + 2H_2O$$

which is an exothermic reaction, and is catalysed by the palladium catalyst in the channels 15a. The heat generated by this combustion reaction is conducted through the walls of the tubes 12 into the adjacent channels 15b. Thus in use the reactor 10 is initially heated using the electrical heating element 14. A mixture of methane and air is then supplied to all the channels 15a at approximately atmospheric pressure, where it undergoes catalytic combustion. A mixture of steam and methane is supplied to the alternate channels 15b, where the steam/methane reforming reaction occurs; the steam and methane mixture is preferably at an elevated pressure, as this raises the mass flow rate and so enables a larger quantity of methane gas to be treated. For example these channels 15b may be at a pressure of 1 MPa.

The gas mixture produced by the steam/methane reforming can then be used to perform a Fischer-Tropsch synthesis, that is to say:

carbon monoxide+hydrogen→paraffin or olefin (say $C_{10}$)+water which is an exothermic reaction, occurring at an elevated temperature, for example 320° C., and an elevated pressure (e.g. 1.8-2.2 MPa) in the presence of a catalyst such as iron, cobalt or fused magnetite, with a potassium promoter. The exact nature of the organic compounds formed by the reaction depends on the temperature, the pressure, and the catalyst, as well as the ratio of carbon monoxide to hydrogen. The heat given out by this synthesis reaction may be used to provide at least part of the heat required by the steam/methane reforming reaction, for example a heat transfer fluid such as helium may be used to transfer the heat from a reactor in which the Fischer-Tropsch synthesis is occurring, the heat being used to preheat at least one of the streams of gases supplied to the reactor 10.

Referring now to FIG. 3, the overall chemical process is shown as a flow diagram. Most of the fluids are at an elevated pressure of 10 bar (1 MPa). The feed gas 24 consists primarily of methane, with a small percentage (say 10%) of ethane and propane at 10 bar. It is passed through a heat exchanger 25 so it is at about 400° C. and is then supplied via a fluidic vortex mixer 26 to a first catalytic reactor 28; in the mixer 26 the feed gas is mixed with a stream of steam that is also at about 400° C. and 10 bar, these streams entering the mixer 26 through tangential inlets and following a spiral path to an axial outlet so they become thoroughly mixed. The first part of the reactor 28 is a pre-reformer 29 with a nickel methanation catalyst at 400° C., in which the higher alkanes react with the steam to form methane (and carbon monoxide). The second part of the reactor 28 is a reformer 30 with a platinum/rhodium catalyst, in which the methane and steam react to form carbon monoxide and hydrogen. This reaction may be performed at 800° C., the heat being provided by combustion of methane over a palladium (or platinum) catalyst. The hot gases from the reformer 30 are then quenched by passing through a heat exchanger 31 to provide the hot steam that is supplied to the vortex mixer 26, and then through the heat exchanger 25 in which they lose heat to the feed gas.

The stream of carbon monoxide and hydrogen is then supplied to a third reactor 32 in which the carbon monoxide and hydrogen react, undergoing Fischer-Tropsch synthesis to form a paraffin or similar compound. This reaction is exothermic, preferably taking place at about 350° C., and the heat is used to preheat the steam supplied to the heat exchanger 31, using a heat exchange fluid such as helium circulated between heat exchange channels in the reactor 32 and a steam generator 33. During this synthesis the volume of the gases decreases, so this process is also performed at the elevated pressure of 10 bar. The resulting gases are then passed into a condenser 34 in which they exchange heat with water initially at 25° C. The higher alkanes (say C5 and above) condense as a liquid, as does the water, this mixture of liquids being passed to a gravity separator 35; the separated higher alkanes can then be removed as the desired product, while the water is returned via the heat exchangers 33 and 31 to the mixer 26. Any lower alkanes or methane, and remaining hydrogen, pass through the condenser 34 and are then supplied to a refrigerated condenser 36 in which the gases and vapours are cooled to about 5° C. The remaining gases, consisting primarily of hydrogen, carbon dioxide, methane and ethane, are passed through a pressure-releasing vent valve 37 to a flare 38. The condensed vapours, consisting primarily of propane, butane and water, are passed to a gravity separator 39, from which the water is combined with the recycled water from the separator 35, while the alkanes are recycled to the inlet of the Fischer-Tropsch reactor 32.

The temperature to which the vapours are lowered in the first condenser 34 determines the molecular weights of the alkanes that are condensed, and so emerge as the product. Hence by changing the temperature of the water supplied to the condenser 34 the characteristics of the product can be modified. The above reaction scheme relies on the steam/methane ratio being close to the stoichiometric requirement for the reformer 30, the rhodium catalyst being particularly resistant to coking; this has the benefit that negligible quantities of carbon dioxide are formed in the reformer 30, so that it is unnecessary to further treat the gases (using the reverse water gas shift reaction) to convert carbon dioxide back to carbon monoxide. It will also be appreciated that if the feed gas consists solely of methane, then the pre-reformer 29 may be omitted.

When used in this fashion the overall result of the processes is that methane is converted to higher molecular weight hydrocarbons which are typically liquids at ambient temperatures and pressures. The processes may be used at an oil or gas well to convert natural gas into a liquid hydrocarbon which is easier to transport.

It will be appreciated that the reactor 10 of FIGS. 1 and 2 may be used for performing a variety of chemical processes, and that the catalyst within each channel 15 must be appropriate to the corresponding process. The gases may be arranged to flow through the channels 15 of the reactor in parallel, or in series. The flows of the two gas mixtures in adjacent channels 15 may be in counter-current or co-current, and the directions of the corrugations (and hence the helical flows) in adjacent channels 15 may be parallel, or inclined. Under some circumstances the helical flow may be used to initiate centrifugal separation between liquid and gaseous products of a reaction.

It will also be appreciated that the reactor 10 may differ in many ways from that described above while remaining within the present invention. For example the number of concentric tubes 12, and the radial width of the channels 15, may differ from that described, and the channels might be of a different length, for example 100 mm. The electrical heater 14 might be replaced by an alternative source of heat, for example an induction heater.

Figure 4:
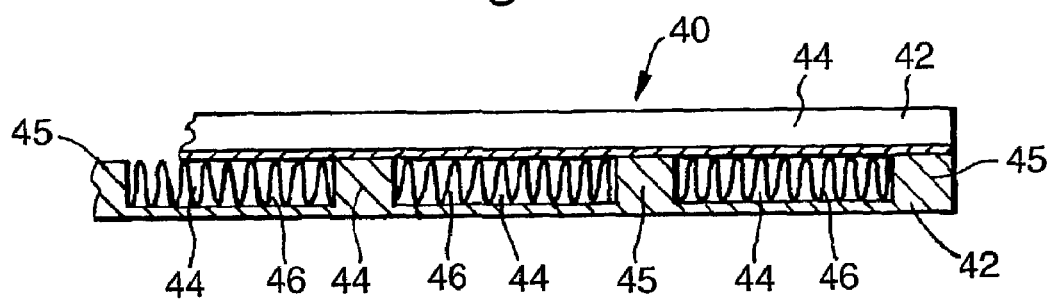
FIG. 4 shows a sectional view of plates stacked to form another alternative catalytic reactor.

Referring now to FIG. 4 an alternative reactor 40 comprises a stack of plates 42 each of Fecralloy steel, in this case the plates being 200 mm square and 3 mm thick (only parts of two plates are shown, in section, in the figure). Grooves 44 of width 8 mm and depth 2.5 mm extend across the entire width of each plate 42 parallel to one side, separated by lands 45 of width 3 mm, the grooves 44 being machined. A carrier foil 46 of Fecralloy steel 50 μm thick coated with a ceramic coating containing a catalyst material, and with corrugations 2.5 mm high, locates in each such groove. 44. A stack of such plates 42 with the catalyst foils 46 is assembled, the orientation of the grooves 44 differing by 90° in successive plates 42, and is covered with a flat top plate of Fecralloy steel; the stack is then diffusion bonded together by heating the stack to a temperature in the range 600° C. to 1200° C. in an inert atmosphere. The stack of plates may be provided with headers either at this stage, or subsequently. Thus the gas flow channels are defined by the grooves 44, one set of channels extending from say right to left in the stack, and the other set of channels (in the alternate plates 42) extending from front to back of the stack.

It will be understood that the type of ceramic deposited on the corrugated foils 46 in the gas flow channels may be different in successive plates 42 in the stack, and that the catalyst materials may differ also. For example (as with the reactor 10 of FIGS. 1 and 2) the ceramic might comprise alumina in one of the gas flows channels, and zirconia in the other gas flow channels.

Preferably, after diffusion bonding, the stack of plates 42 is then held at about 900° C. while passing an oxidising gas stream through all the grooves 44 defining the gas flow channels. This promotes the formation of an alumina-rich oxide layer on the surfaces of the channels. After this oxidation step, the stack is cooled to room temperature, and an aqueous suspension of either alumina or zirconia sol is pumped through the grooves 44 and then allowed to drain out (so leaving a coating of sol on the walls of the channels); the viscosity of the sol suspension can be adjusted either by changing its pH or concentration, and the removal of excess sol may rely upon draining under gravity, or may require pumping, depending on the viscosity. The stack is then sintered in an oxidising atmosphere at a temperature of, for example, approximately 800° C., such that the alumina sol particles sinter onto the oxide layer on the surface of the Fecralloy steel so forming a ceramic catalyst-carrier layer. This layer is desirably of thickness in the range 10-50 μm, and the steps of coating with the appropriate sol and then sintering may be repeated, if necessary, to achieve the desired thickness. Finally a solution of an appropriate catalytic metal salt is pumped through the channels 44, and the stack is then dried, and thermally treated in a reducing (or oxidising) atmosphere to produce the desired form of dispersed catalyst metal on the ceramic carrier layer within the gas flow channels 44.

As with the reactor 10, the reactor formed from the plates 42 would be suitable for performing steam/methane reforming, for example using a rhodium catalyst. The heat required to cause this reaction may be provided by combustion of methane, which may be catalysed by a palladium catalyst. Because the plates 42 forming the stack are bonded together the gas flow channels are gas tight (apart from communication with headers at each end), and the pressures in the alternate gas flow channels may also be different, as mentioned in relation to the reactor 10.

Figure 5:
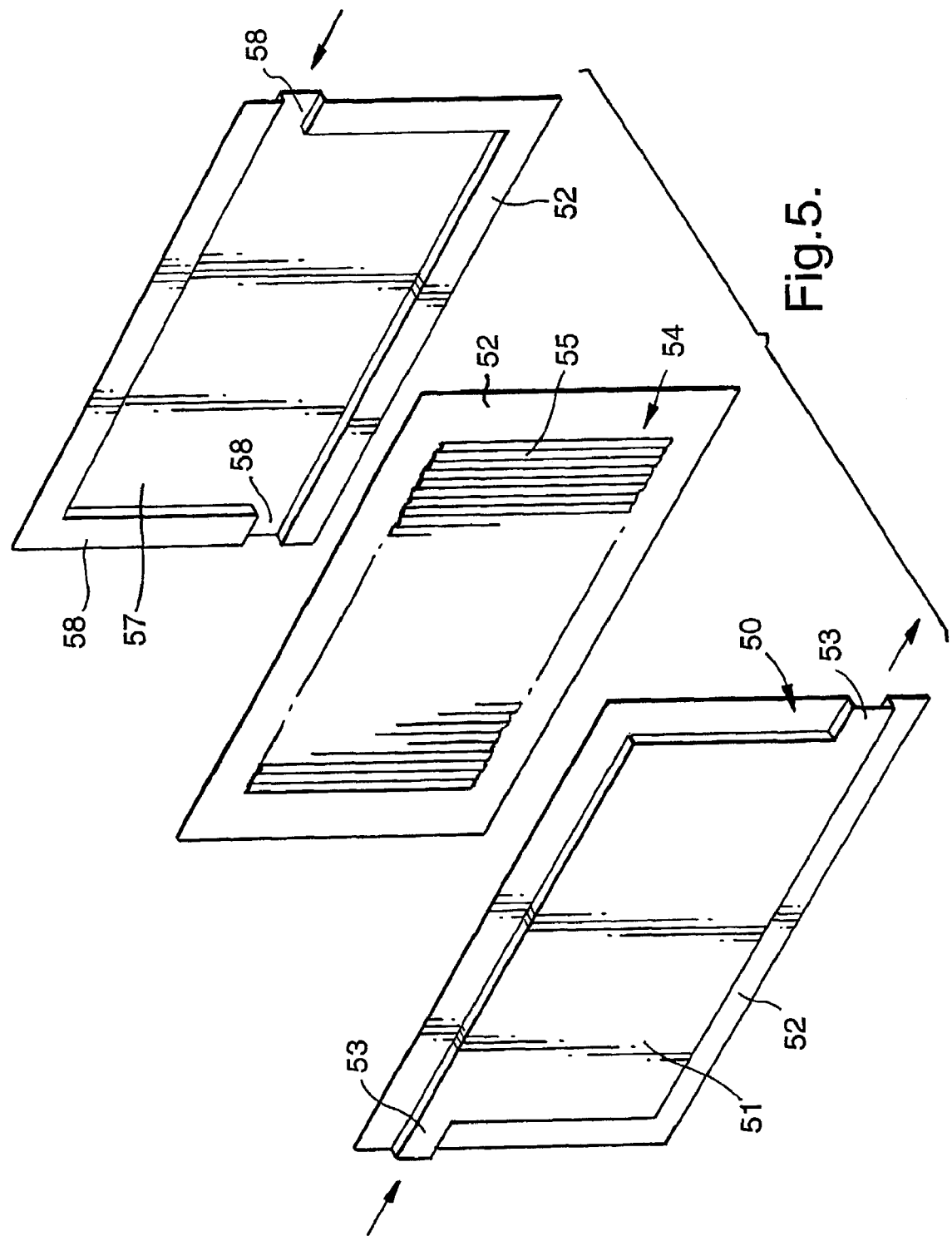
FIG. 5 shows an exploded perspective view of three sheets forming a module of another alternative catalytic reactor.

Referring now to FIG. 5, this shows an exploded perspective view of three sheets of Fecralloy steel which when assembled form a module of another alternative catalytic reactor. Each sheet 50, 54 and 56 is generally rectangular, 30 mm by 100 mm, the sheets 50 and 56 being of thickness 0.3 mm and the sheets 54 of thickness about 50 μm, and each is hydraulically shaped. The first sheet 50 is pressed to form a rectangular recess 51, 1 mm deep, surrounded by a flat peripheral flange 52 in which are inlet and outlet recesses 53. The middle sheet 54 has a central rectangular section in which are parallel corrugations 55, the length of the corrugations 55 being slightly less than the height of the recess 51, surrounded by a flat peripheral flange 52; the corrugations 55 project 1 mm above the plane of the flange 52 on each side of the sheet 54. The third sheet 56 forms a rectangular recess 57, 1 mm deep, surrounded by a flat peripheral flange 52 in which are inlet and outlet recesses 58. The surfaces of the corrugations 55 are coated with a thin layer of ceramic material, combined with a catalytic material. The ceramic material and the catalyst material coating the corrugations 55 on one side of the sheet 54 may be different from the ceramic material and the catalyst material coating the corrugations 55 on the opposite side of the sheet 54.

The sheets 50, 54 and 56 are then assembled, with the corrugations 55 projecting into the recesses 51 and 57, and the three peripheral flanges 52 are bonded together by welding, brazing, or diffusion bonding. Different gas mixtures can then be supplied to the gas flow channels defined on opposite sides of the centre sheet 54, one gas mixture being provided through the recesses 53, and the other through the recesses 58. A plurality of such three-sheet modules can be assembled and provided with headers for the different gas mixtures.

Figure 6:
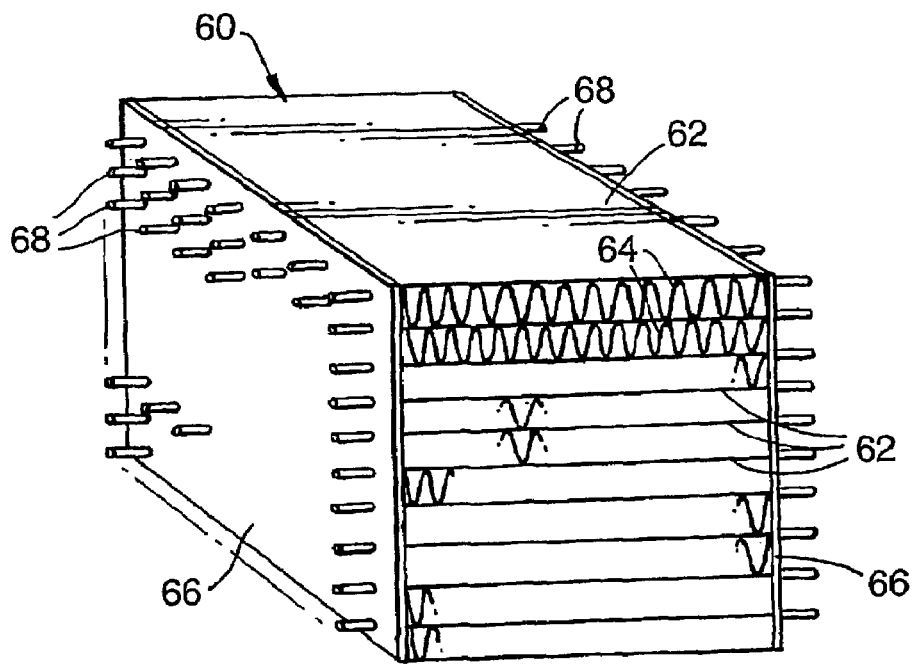
FIG. 6 shows a perspective view of another alternative catalytic reactor.

Referring now to FIG. 6, this shows a perspective view of an alternative catalytic reactor 60 consisting of a stack of rectangular plates 62 of Fecralloy steel, each 100 mm long, 50 mm wide, and 0.1 mm thick, spaced apart by corrugated foils 64 also of Fecralloy steel, the height of the corrugations (and so the separation between the plates 62) being 4 mm. The foils 64 define several transverse slots that are aligned with each other. At each side of the stack is a side plate 66, and many narrow tubes 68 extend through holes drilled in the side plates 66 and through the aligned slots in the foils 64, there being 24 such tubes 68 along the length of each corrugated foil 64, the tubes 68 being 4 mm apart. Each tube 68 is of Fecralloy steel, of internal diameter 2 mm and of wall thickness 0.1 mm. The tubes 68 are diffusion bonded (or alternatively brazed) to the side plates 66.

The inside surfaces of the tubes 68 are coated with a ceramic material and catalyst for a reaction that occurs at elevated pressure, such as methane reforming, and the surfaces of the channels defined by the corrugated foils 64 and the plates 62 are coated with a ceramic material and catalyst for a different reaction, such as methane combustion, as in the previously-described reactors. Headers (not shown) are attached to the side plates 66 to supply a gas mixture through the tubes 68, and headers (not shown) are attached to the ends of the stack to supply a gas mixture through the channels defined by the corrugated foils 64 and the plates 62. It will again be appreciated that there is good thermal contact between the gases in the two sets of gas flow channels.

It will be appreciated that the benefits of such narrow gas flow passages are that the diffusion path lengths are short, and that heat and mass transfer rates are increased because there is less effect of the boundary layer. Hence the rate of chemical reaction, which requires diffusion of the reacting species into contact with the catalytic surfaces, is enhanced, and also the rate of transfer of heat between the exothermic reaction and the endothermic reaction is also enhanced. Consequently such catalytic reactors can provide a high power density.

As described above, the ceramic coatings may be deposited from a material in the form of a sol, that is to say a dispersion containing particles with a particle size between 1 nm and 1 μm. For a particular sol, such as alumina sol, the way in which the sol is prepared determines the particle size. Some alumina sols have individual particles as the primary sol particles (so-called unaggregated), whereas some alumina sols have sol particles that are aggregates of smaller particles. In general, the aggregated type of sol will give a more porous ceramic coating than an unaggregated sol. Thus by selecting the type of sol used, or by mixing various amounts of different types of sol, the porosity of the ceramic coating can be controlled. The catalytic activity of the ceramic coating can be controlled by adjusting the porosity of the ceramic and the loading of the catalytic material. When making a catalytic reactor for performing a very exothermic reaction it may be desirable to adjust the catalytic activity along the flow path, for example to provide low catalytic activity initially, and higher catalytic activity further along the flow path, so as to prevent formation of hot spots. This may, for example, be appropriate in the case of reactors for performing Fischer-Tropsch synthesis. When using a zirconia sol to form a zirconia ceramic coating similar considerations apply; and in addition it may be desirable to include cations such as yttrium so as to form stabilized zirconia, particularly where the ceramic coating may reach high temperatures during operation, as stabilised zirconia provides a stable surface area.

Referring again to FIG. 4 it will be appreciated that the gas flow channels 44 may vary in width and depth along their length, so as to vary the fluid flow conditions, and the heat or mass transfer coefficients, so as to control the chemical reactions at different places within the reactor 40. This is particularly applicable in a reactor for Fischer-Tropsch synthesis, in which the gas volume decreases, as by appropriate tapering of the channels 44 the gas velocity may be maintained as the reaction proceeds. Furthermore the pitch or pattern of the corrugated foils 46 may vary along a reactor channel 44 to adjust catalytic activity, and hence provide for control over the temperatures or reaction rates at different points in the reactor 40. The corrugated foils 46 may also be shaped, for example with perforations, to promote mixing of the fluid within the channels 44.

Figure 7:
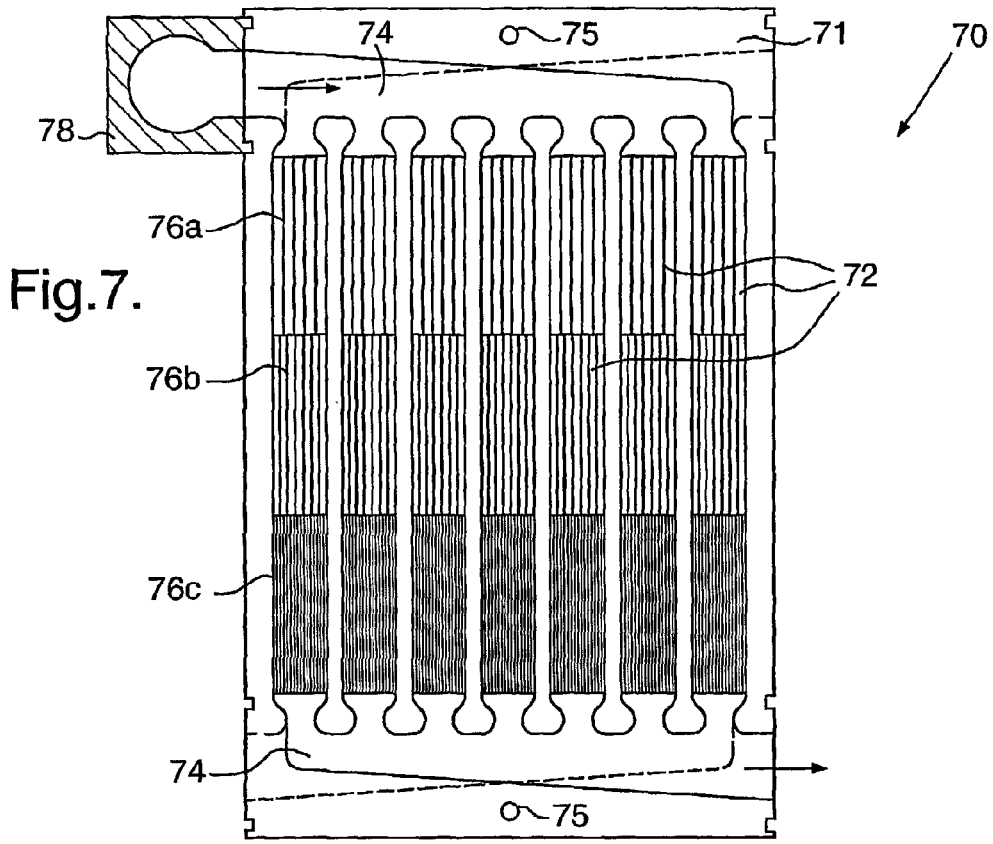
FIG. 7 shows a plan view of a plate used to form another alternative catalytic reactor.

Referring now to FIG. 7, an alternative reactor 70 comprises a stack of Fecralloy steel plates 71, each plate being generally rectangular, 125 mm long and 82 mm wide and 2 mm thick. Along the centre portion of each plate 71, seven parallel rectangular grooves 72 are machined, each of depth 0.75 mm, with a header groove 74 of the same depth at each end, the header groove 74 extending to one side edge of the plate 71. On the top surface of the plate 71 shown in the figure the header groove 74 at the bottom end extends to the right hand edge of the plate 71, while that at the top end extends to the left hand edge of the plate 71. The grooves on the opposite surface of the plate 71 are identical but the headers (indicated in broken lines) extend to opposite sides of the plate 71. Successive plates 71 have their header grooves 74 in mirror image arrangements, so the adjacent grooves 74 extend to the same side of the stack. Within each rectangular groove 72 are three corrugated Fecralloy foils 76a, b and c, each 50 μm thick and with its corrugations 1.8 mm high, but differing in the pitch or wavelength of their corrugations. To ensure accurate alignment of the plates 71 during assembly, holes 75 are provided at each end into which dowels locate. The stack of plates 71 and foils 76 is assembled and compressed during diffusion bonding, so that the foils are compressed to 1.5 mm in height. Gas flow plenums 78 are then brazed onto the stack at each corner, each plenum 78 communicating with one set of header grooves 74.

Figure 8:
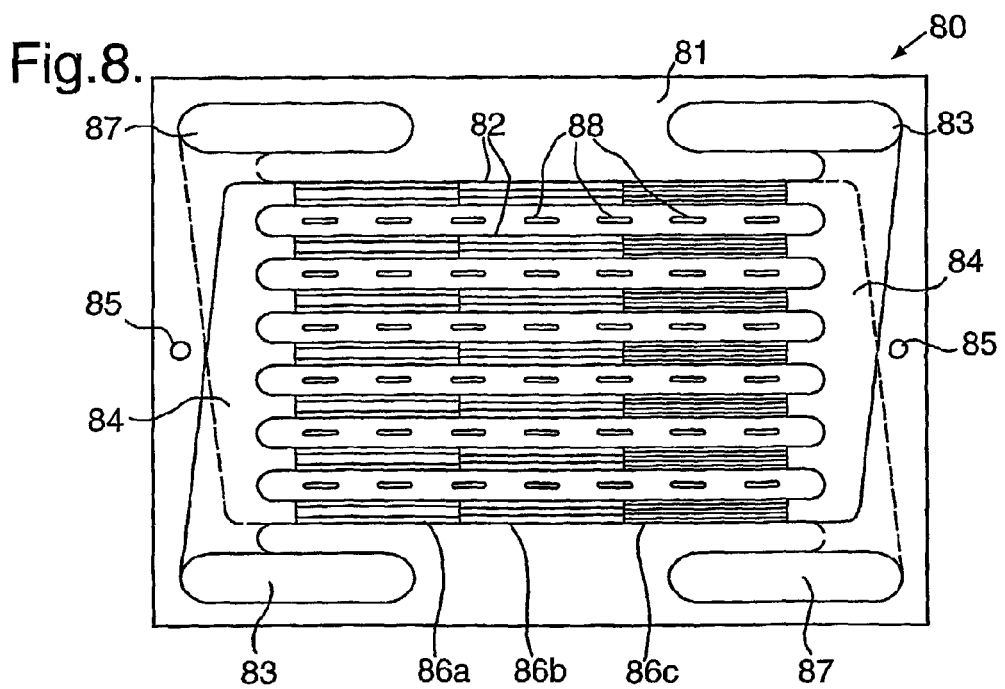
FIG. 8 shows a plan view of a plate used to form another alternative catalytic reactor.

Referring now to FIG. 8, an alternative reactor 80 has some similarities to the reactor 70 in comprising a stack of Fecralloy steel plates 81, each plate being generally rectangular, 125 mm long and 90 mm wide and 2 mm thick. Along the centre portion of each plate 81, seven parallel rectangular grooves 82 are machined, each of width 4 mm and depth 0.75 mm, and at a separation of 5 mm, with a header groove 84 of the same depth at each end, the header groove 84 extending to a header aperture 83 near one side edge of the plate 81. On the top surface of the plate 81 shown in the figure the gas flow is therefore from the aperture 83 at the bottom left to the aperture 83 at the-top right. The grooves on the opposite surface of the plate 81 are identical but the headers (indicated in broken lines) extend to header apertures 87 near opposite sides of the plate 81. Successive plates 81 have their header grooves 84 in mirror image arrangements, so the adjacent grooves 84 communicate with the same pairs of header apertures 83 or 87. Within each rectangular groove 82 are three corrugated Fecralloy foils 86a, b and c, each 50 μm thick and with its corrugations 1.8 mm high, but differing in the pitch or wavelength of their corrugations. To ensure accurate alignment of the plates 81 during assembly, holes 85 are provided at each end into which dowels locate. The stack of plates 81 and foils 86 is assembled and compressed during diffusion bonding, so that the foils are compressed to 1.5 mm in height. Gas flow plenums connections are then made to the apertures 83 and 87 at the top of the stack, which are closed at the bottom of the stack. Not only does the reactor 80 differ from the reactor 70 in having integral headers defined by the apertures 83 and 87 (in place of the plenums 78), but in addition seven slots 88 through the plates 81 are defined in each land between the rectangular grooves 82, each slot 82 being 1 mm wide and 6 mm long. After assembly of the stack these slots 88 provide a flow path for a third gas stream, for example for pre-heating a gas stream.

Figure 9A:
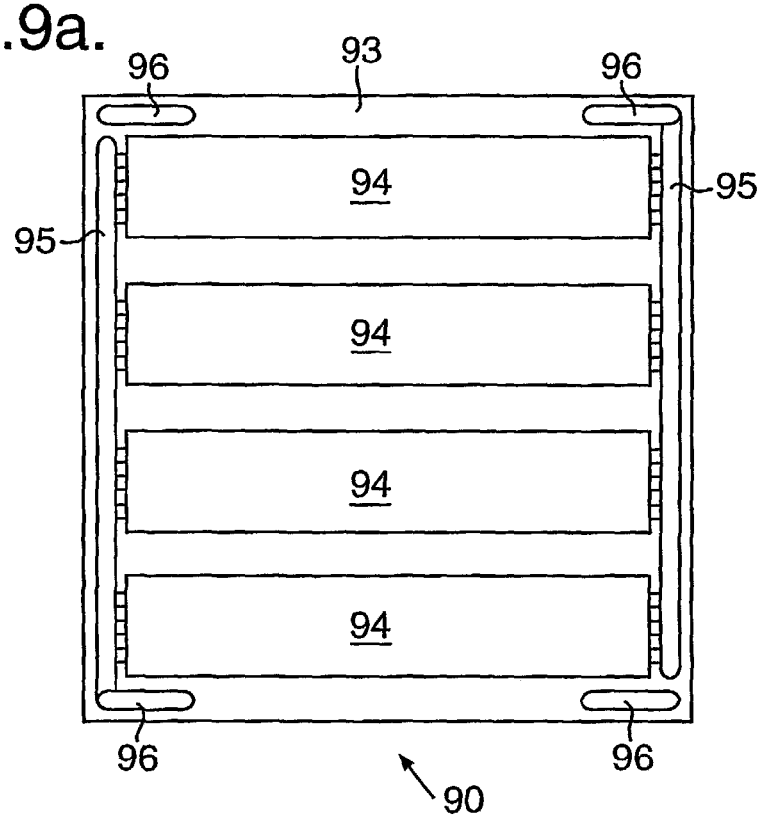
FIGS. 9a and 9b show plan views of plates used to form another alternative catalytic reactor.
Figure 9B:
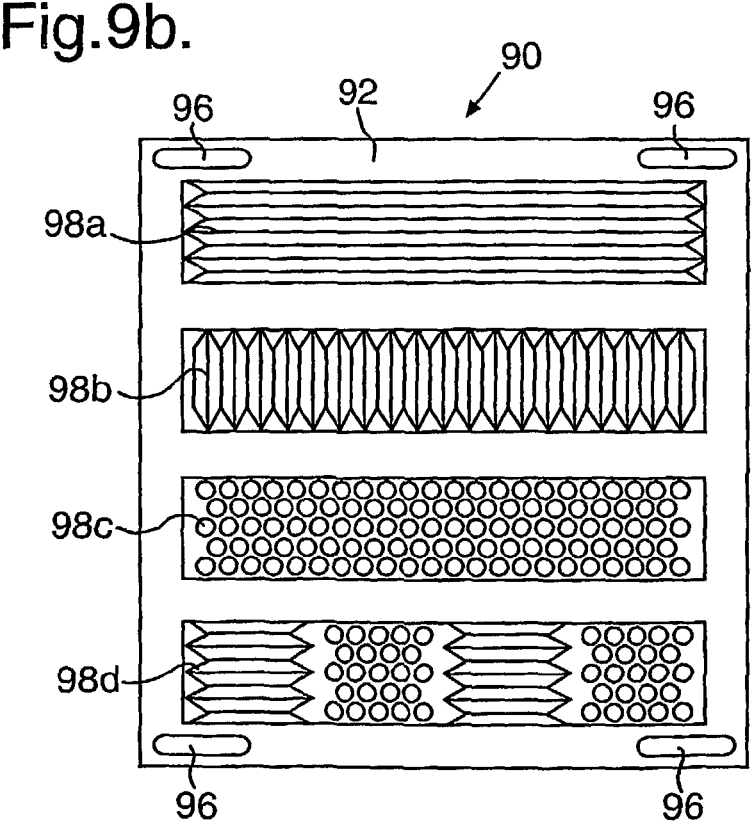

Referring down to FIGS. 9a and 9b, an alternative reactor 90 comprises a stack of corrugated foils 92 spaced apart by frames 93. Each frame (as shown in FIG. 9a) comprises a generally square plate 93 of Fecralloy steel, 60 mm square and 1 mm thick, that defines four rectangular apertures 94 each 50 mm by 10 mm. At each end of the plate 93 is a header groove 95 of depth 0.5 mm communicating via notches with each aperture 94. Near the corners of each plate 93 are header apertures 96. There are two types of frame, which are used alternately in the stack. In one type (as shown) the header grooves 95 communicate with the apertures 96 at the bottom left and top right of the plate 93 (as shown), while in the other type (not shown) the header grooves 95 communicate with the apertures 96 at the top left and bottom right of the plate 93. Each foil 92 (as shown in FIG. 9b) is also 60 mm square, and of thickness 0.5 mm. Near each corner it defines header apertures 96. Four rectangular areas 98 (which correspond to the apertures 94) are corrugated with an amplitude of 0.5 mm above and below the plane of the foil. In practice each such area 98 is generally corrugated in the same pattern, but four different patterns are shown: area 98a has corrugations extending longitudinally along the flow channel; area 98b has corrugations extending transverse to the direction of flow; area 98c has dimples; while area 98d has both corrugations extending longitudinally and also dimples. The reactor 90 consists of a stack of the foils 92 spaced apart by the two types of frame 93 used alternately, the bottom of the stack comprising a blank square plate (not shown) followed by a frame 93, and the top of the stack comprising a frame 93 covered by a square plate (not shown) that defines apertures corresponding to the apertures 96. The stack is assembled and compressed during diffusion bonding to form an integral reactor.

It will be appreciated that many other reactors may be designed using the principles of the invention. For example, catalyst may be provided within the gas flow channels in the form of a gas-permeable packing of small ceramic spheres, say of diameter 0.1 mm, these being packed into the corrugations of the metal foil. In this case the metal foil provides the principal heat transfer surface for the gases, while the chemical reactions take place at the catalytic spheres. This enables the catalyst to be removed and replaced if its activity decreases.

The invention claimed is:

1. A catalytic reactor comprising a plurality of metal sheets arranged for defining first gas flow channels between adjacent sheets, means for defining second gas flow channels in proximity to said first gas flow channels, arranged for ensuring good thermal contact between gases in said first and said second gas flow channels; catalytic material on at least some surfaces within each flow channel, and header means for supplying gas mixtures to said gas flow channels, said header means being arranged for supplying different gas mixtures to said first and said second gas flow channels, said metal sheets being substantially flat and said gas flow channels being defined by grooves therein such that gases in said first and said second gas flow channels may differ in pressure by several atmospheres; portions of said sheet between said grooves being in contact with the adjacent metal sheet for providing thermal contact, and said metal sheets being bonded together as a stack; characterized by corrugated metal foils provided in gas flow channels, said foils being of an aluminium-bearing ferritic steel that forms an adherent oxide coating of alumina on surfaces of said foils when heated in air, and having said catalytic material on said surfaces.

2. A catalytic reactor as claimed in claim 1 wherein said corrugated metal foils are compressed within said flow channels.

3. A catalytic reactor as claimed in claim 1 wherein corrugations in said metal foils are of different pitch, wavelength or pattern at successive positions along said flow channel.

4. A catalytic reactor as claimed in claim 1 wherein said corrugated foils are shaped for promoting mixing of said gases within said flow channel.

5. A catalytic reactor as claimed in claim 1 wherein at least some of said gas flow channels vary in width or depth along their length.

6. A catalytic reactor comprising a series of metal sheets arranged as a stack and bonded together, said sheets being shaped and arranged for defining a plurality of first fluid flow channels between adjacent sheets and a plurality of second fluid flow channels between adjacent sheets, said first fluid flow channels alternating with said second fluid flow channels in the stack, and portions of each channel-defining sheet between flow channels being in contact with the adjacent metal sheet for providing good thermal contact between fluids in the first and the second flow channels, and providing structural support such that fluids in the first and the second flow channels may differ in pressure; header means for supplying fluids to the flow channels, said header means enabling different fluids to be supplied to the first and the second flow channels; and catalyst-carrying metal sheets in at least some of the flow channels, each catalyst-carrying metal sheet being shaped for subdividing a respective flow channel into a multiplicity of parallel flow sub-channels, and each catalyst-carrying metal sheet having the catalytic material on its surface.

7. A catalytic reactor as claimed in claim 6 wherein each catalyst-carrying metal sheet is a corrugated metal foil, and is not structural.

8. A catalytic reactor as claimed in claim 6 wherein said parallel flow sub-channels are of different pitch, wavelength or pattern at successive positions along the flow channel.

9. A catalytic reactor as claimed in claim 6 wherein each catalyst-carrying metal sheet is of an aluminium-bearing ferritic steel that forms an adherent oxide coating of alumina when heated in air.

10. A catalytic reactor as claimed in claim 6 wherein at least some of the flow channels vary in width or depth along their length.

11. A catalytic reactor as claimed in claim 6 wherein both said first and second flow channels are less than 5 mm wide in at least one direction transverse to the flow direction.

12. A catalytic reactor as claimed in claim 6 wherein the flow direction of the first flow channels is transverse to the flow direction of the second flow channels.

13. A catalytic reactor comprising a series of metal sheets arranged as a stack and bonded together, said sheets being shaped and arranged for defining a plurality of first flow channels between adjacent sheets and a plurality of second flow channels between adjacent sheets, first flow channels alternating with second flow channels in the stack, and portions of each channel-defining sheet between flow channels being in contact with the adjacent metal sheet and so providing thermal contact, such that there is good thermal contact between fluids in the first and the second flow channels, and providing structural support such that fluids in the first and the second flow channels may differ in pressure; headers for supplying fluids to the flow channels, said headers enabling different fluids to be supplied to the first and the second flow channels; and catalyst-carrying metal substrates in at least some of the flow channels; wherein the flow direction of the first flow channels is transverse to the flow direction of the second flow channels.

14. A catalytic reactor as claimed in claim 13 wherein at least some of the flow channels vary in width or depth along their length.

15. A catalytic reactor as claimed in claim 13 wherein both the first and the second flow channels are less than 5 mm wide in at least one direction transverse to the flow direction.

16. A catalytic reactor comprising a plurality of metal sheets arranged as a stack and bonded together; said sheets being shaped for defining first gas flow channels between adjacent sheets and second gas flow channels between further adjacent sheets wherein said first gas flow channels alternate with said second gas flow channels within said stack; header means for supplying different fluids to said first and second gas flow channels; said first and second gas flow channels being arranged for providing good thermal contact between said different fluids flowing in flow paths along said first and second flow channels; metal foil means disposed within said first gas flow channels and said second gas flow channels and having catalyst material carried thereon; said catalyst material, at least in said first gas flow channels, having catalytic activity varied along the flow path for providing low catalytic activity initially and higher catalytic activity further along said flow path.

17. The catalytic reactor as defined in claim 16 wherein said catalytic activity is varied by adjusting the loading of said catalytic material along said flow path.

18. The catalytic reactor as defined in claim 16 wherein said metal foil means include a ceramic coating thereon, and said catalytic material is incorporated into said ceramic coating.

19. The catalytic reactor as defined in claim 18 wherein said ceramic coating is of thickness in the range 10-50 µm.

20. The catalytic reactor as defined in claim 18 wherein said ceramic coating in at least some of said gas flow channels is comprised of alumina.

21. The catalytic reactor as defined in claim 16 wherein said metal foils are corrugated and are comprised of aluminum-bearing ferritic steel.

22. The catalytic reactor as defined in claim 16 wherein at least some of said flow channels vary in width or depth along their length.

23. The catalytic reactor as defined in claim 16 wherein both said first flow channels and said second flow channels are less than 5 mm wide in at least one direction transverse to the flow direction.

* * * * *